United States Patent
Matsutani

(10) Patent No.: US 7,849,277 B2
(45) Date of Patent: Dec. 7, 2010

(54) BANK CONTROLLER, INFORMATION PROCESSING DEVICE, IMAGING DEVICE, AND CONTROLLING METHOD

(75) Inventor: Takashi Matsutani, Osaka (JP)

(73) Assignee: MegaChips Corporation, Osaka-shi (JP)

(*) Notice: Subject to any disclaimer, the term of this patent is extended or adjusted under 35 U.S.C. 154(b) by 932 days.

(21) Appl. No.: 11/625,636

(22) Filed: Jan. 22, 2007

(65) Prior Publication Data

US 2007/0183248 A1 Aug. 9, 2007

(30) Foreign Application Priority Data

Jan. 24, 2006 (JP) .............................. 2006-014738

(51) Int. Cl.
*G06F 13/18* (2006.01)
(52) U.S. Cl. ...................... 711/158; 707/752; 711/151; 710/40; 710/244
(58) Field of Classification Search ................. 711/158, 711/151; 707/752; 710/40, 244
See application file for complete search history.

(56) References Cited

U.S. PATENT DOCUMENTS

2003/0005253 A1* 1/2003 Liao et al. .................... 711/169

* cited by examiner

*Primary Examiner*—Hong Kim
*Assistant Examiner*—Jae U Yu
(74) *Attorney, Agent, or Firm*—Oblon, Spivak, McClelland, Maier & Neustadt, L.L.P.

(57) ABSTRACT

A bank controller, an information processing device, an imaging device, and a control method are provided which enable improved data communication processing between FIFO memories of processing blocks and a synchronous DRAM. An arbiter determines the order of priorities in data communication performed between FIFO memories and associated banks. A precharge period detecting block detects the states of precharge of the banks. A register stores data required to determine the order of priorities (data indicating whether the banks are in a precharge period, data indicating whether data communication request signals are presented). This enables the arbiter to exclude FIFO memories that are associated with banks that are not allowed to perform data communication. Efficient data communication is thus implemented between the FIFO memories and the synchronous DRAM.

10 Claims, 5 Drawing Sheets

F I G . 1
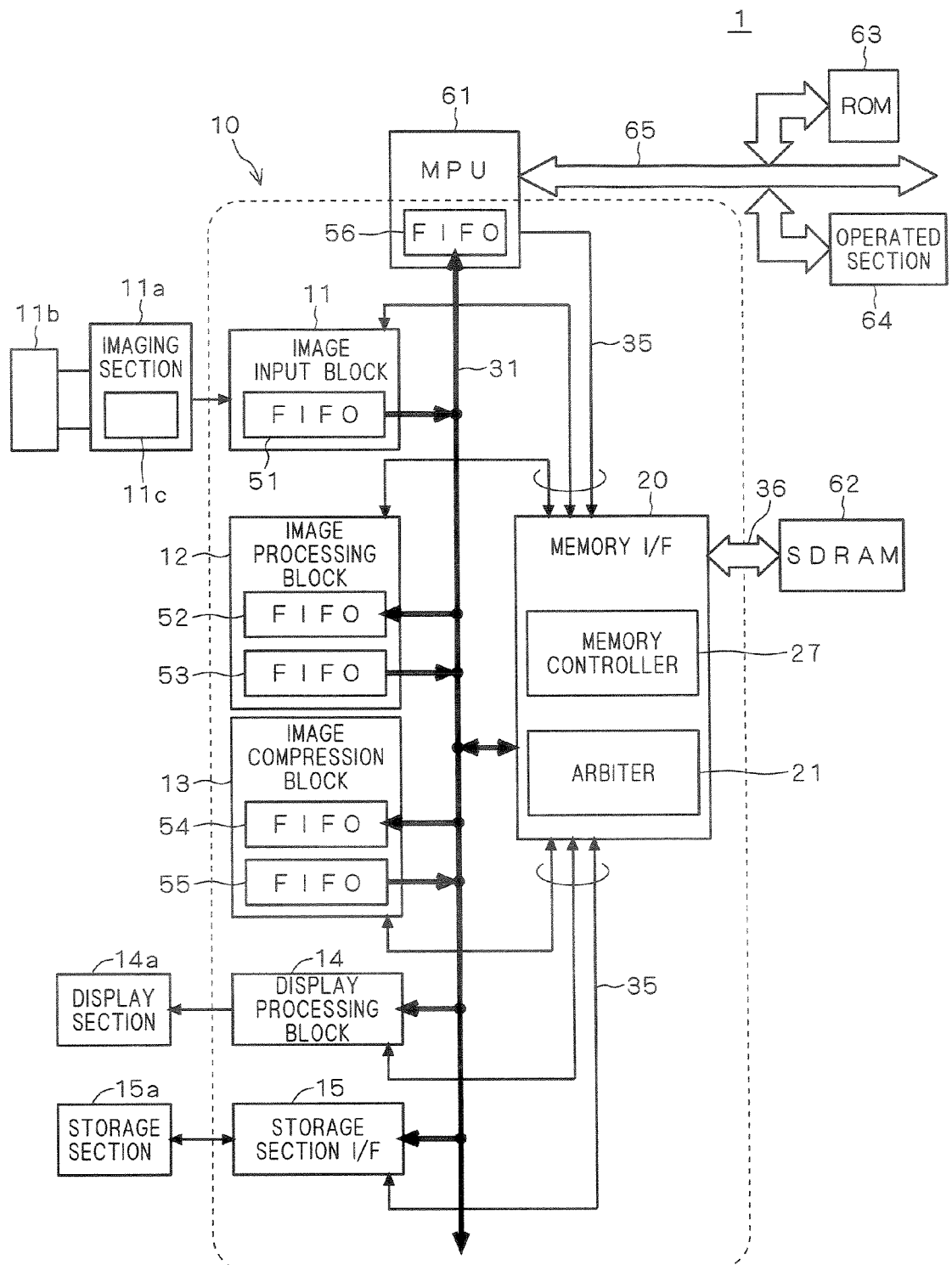

FIG. 3

|  | PRECHARGE FLAG | REQUEST SIGNAL FLAG | PRIORITY |
|---|---|---|---|
| FIFO51 | False | True | 1 |
| FIFO52 | False | True | 2 |
| FIFO53 | False | True | 3 |
| FIFO54 | False | True | 4 |
| FIFO55 | False | True | 5 |
| FIFO56 | False | True | 6 |

FIG. 4

|  | PRECHARGE FLAG | REQUEST SIGNAL FLAG | PRIORITY |
|---|---|---|---|
| FIFO51 | False | True | 1 |
| FIFO52 | False | False | — |
| FIFO53 | False | True | 2 |
| FIFO54 | False | False | — |
| FIFO55 | False | True | 3 |
| FIFO56 | False | True | 4 |

FIG. 5

|  | PRECHARGE FLAG | REQUEST SIGNAL FLAG | PRIORITY |
|---|---|---|---|
| FIFO51 | True | True | — |
| FIFO52 | False | False | — |
| FIFO53 | False | True | 1 |
| FIFO54 | True | False | — |
| FIFO55 | True | True | — |
| FIFO56 | False | True | 2 |

FIG. 6

|  | PRECHARGE FLAG | REQUEST SIGNAL FLAG | PRIORITY |
|---|---|---|---|
| FIFO51 | False | True | 1 |
| FIFO52 | False | False | — |
| FIFO53 | False | True | 2 |
| FIFO54 | True | False | — |
| FIFO55 | True | True | — |
| FIFO56 | False | True | 3 |

F I G . 7

|  | PRECHARGE FLAG | REQUEST SIGNAL FLAG | PRIORITY |
|---|---|---|---|
| FIFO51 | True | True | 3 |
| FIFO52 | False | False | — |
| FIFO53 | False | True | 1 |
| FIFO54 | True | False | — |
| FIFO55 | True | True | 4 |
| FIFO56 | False | True | 2 |

F I G . 8

|  | PRECHARGE FLAG | REQUEST SIGNAL FLAG | PRIORITY |
|---|---|---|---|
| FIFO51 | True | True | 4 |
| FIFO52 | False | False | — |
| FIFO53 | False | True | 1 |
| FIFO54 | False | False | — |
| FIFO55 | False | True | 2 |
| FIFO56 | False | True | 3 |

BANK CONTROLLER, INFORMATION PROCESSING DEVICE, IMAGING DEVICE, AND CONTROLLING METHOD

BACKGROUND OF THE INVENTION

1. Field of the Invention

The present invention relates to a bank controller that controls data communication between banks of a synchronous DRAM and associated FIFO memories, an information processing device and an imaging device having the bank controller, and a control method therefor, and particularly to an improvement of the method of determining the order of priorities of the FIFO memories.

2. Description of the Background Art

Conventionally known methods of performing data communication between a device and memory without through the MPU (Micro Processing Unit) include the DMA (Direct Memory Access) transfer technique, for example. Information processing devices that can implement the DMA transfer scheme are also conventionally known.

Devices involved in a DMA transfer system are assigned numbers (hereinafter referred to also as "DMA channels") so that the devices can be uniquely identified. In the DMA transfer, data is transferred directly between the memory and a device designated with the DMA channel. When a plurality of devices issue transfer requests to the DMA controller, the DMA controller gives priority for data transfer to a device having a smaller DMA channel number.

Synchronous DRAM (SDRAM: Synchronous Dynamic Random Access Memory) is divided into a plurality of banks, and it is known that each bank is capable of performing data transfer independently of other banks. For example, even when one bank is being precharged, another bank can perform data transfer with a device.

"Precharging" is an operation that is performed to prevent loss of stored data (information) after the data is read out. Data read/write operation cannot be applied to a bank being precharged.

However, if a device that is associated with the bank being precharged is given the high priority, the data transfer operation by the associated device is made to wait until the precharging operation of the bank is completed. Then, the bus that electrically connects the device and the synchronous DRAM is continuously occupied despite the absence of data transfer. This lowers the data transfer efficiency of the entire information processing device.

SUMMARY OF THE INVENTION

The present invention is directed to a bank controller that controls communication to banks of a synchronous DRAM.

According to the present invention, a bank controller includes: a plurality of processing blocks each having at least one FIFO memory that is associated with one of the banks of the synchronous DRAM and capable of performing data communication with the associated bank, where the plurality of processing blocks perform predetermined operations with data stored in the FIFO memories; and a memory interface that controls the data communication, where the memory interface includes: a priority order determining block that determines an order of priorities in the data communication between the FIFO memories and the associated banks; and a memory controller that implements the data communication between one of the FIFO memories that is assigned a high priority in the data communication and the associated bank, wherein the priority order determining block determines the order of priorities in the data communication at least on the basis of the states of precharge of the banks.

Thus, the rate of access to the synchronous DRAM is enhanced.

Preferably, the priority order determining block determines the order of priorities among the FIFO memories in such a way that, when any of the banks is being precharged, the one or more of the FIFO memories that are associated with the bank being precharged are excluded from the determination of the order of priorities and the order of priorities is determined among ones of the FIFO memories associated with ones of the banks that are not being precharged.

This prevents occurrence of waits due to precharge periods, and enables efficient data communication between the FIFO memories and the synchronous DRAM.

Preferably, the priority order determining block determines the order of priorities among the FIFO memories in such a way that, when any of the banks is being precharged, the one or more of the FIFO memories that are associated with the bank being precharged are ranked lower in priority than ones of the FIFO memories associated with ones of the banks that are not being precharged.

This alleviates the problem that the data communication is disrupted when a bank being precharged is selected for data communication, and enables efficient data communication between the FIFO memories and the synchronous DRAM.

The present invention is directed also to an information processing device.

According to the invention, an information processing device includes the bank controller described above and the synchronous DRAM, and the synchronous DRAM is connected to the bank controller through a bus.

Thus, the rate of access to the synchronous DRAM is enhanced.

The present invention is directed also to an imaging device.

According to the invention, an imaging device includes: an imaging section; a synchronous DRAM; and a bank controller that controls communication to banks of the synchronous DRAM, where the bank controller includes: a plurality of processing blocks each having at least one FIFO memory that is associated with one of the banks of the synchronous DRAM and capable of performing data communication with the associated bank, where the plurality of processing blocks perform predetermined operations with data stored in the FIFO memories; and a memory interface that controls the data communication, where the memory interface includes: a priority order determining block that determines an order of priorities in the data communication between the FIFO memories and the associated banks; and a memory controller that implements the data communication between one of the FIFO memories that is assigned a high priority in the data communication and the associated bank, wherein the plurality of processing blocks include an image input block that at least performs operations of temporarily storing image data captured by the imaging section into its own FIFO memory and sending the image data to the synchronous DRAM, and wherein the priority order determining block determines the order of priorities among the FIFO memories at least on the basis of information about the states of precharge of the banks, and information about channel numbers assigned to the FIFO memories, where these pieces of information are referred to in this order of precedence, and wherein the channel number assigned to the FIFO memory of the image input block is set such that the FIFO memory of the image input block is assigned the highest priority when pieces of information other than the information about the channel numbers are in the same conditions.

This allows the image input block, which requires real-time properties, to smoothly achieve its operations.

The present invention is directed also to a method of controlling data communication performed between banks of a synchronous DRAM and a bank controller.

According to the invention, the bank controller includes a plurality of processing blocks each having at least one FIFO memory that is associated with one of the banks of the synchronous DRAM and capable of performing data communication with the associated bank, and the control method includes the steps of: (a) applying predetermined operations to data stored in the FIFO memories; (b) determining an order of priorities in the data communication between the FIFO memories and the associated banks; and (c) implementing the data communication between one of the FIFO memories that is assigned a high priority in the data communication and the associated bank, wherein the step (b) determines the order of priorities in the data communication at least on the basis of the states of precharge of the banks.

Thus, the rate of access to the synchronous DRAM is enhanced.

An object of the present invention is to provide a bank controller, an information processing device, an imaging device, and a control method that enable improved data communication operations between FIFO memories of processing blocks and a synchronous DRAM.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing an example of the configuration of the information processing device according to first and second preferred embodiments of the present invention;

FIGS. 3 to 6 are diagrams showing examples of values that are stored in the register in the first preferred embodiment; and FIGS. 7 and 8 are diagrams showing examples of values that are stored in the register in the second preferred embodiment.

DESCRIPTION OF THE PREFERRED EMBODIMENTS

Figure 2:
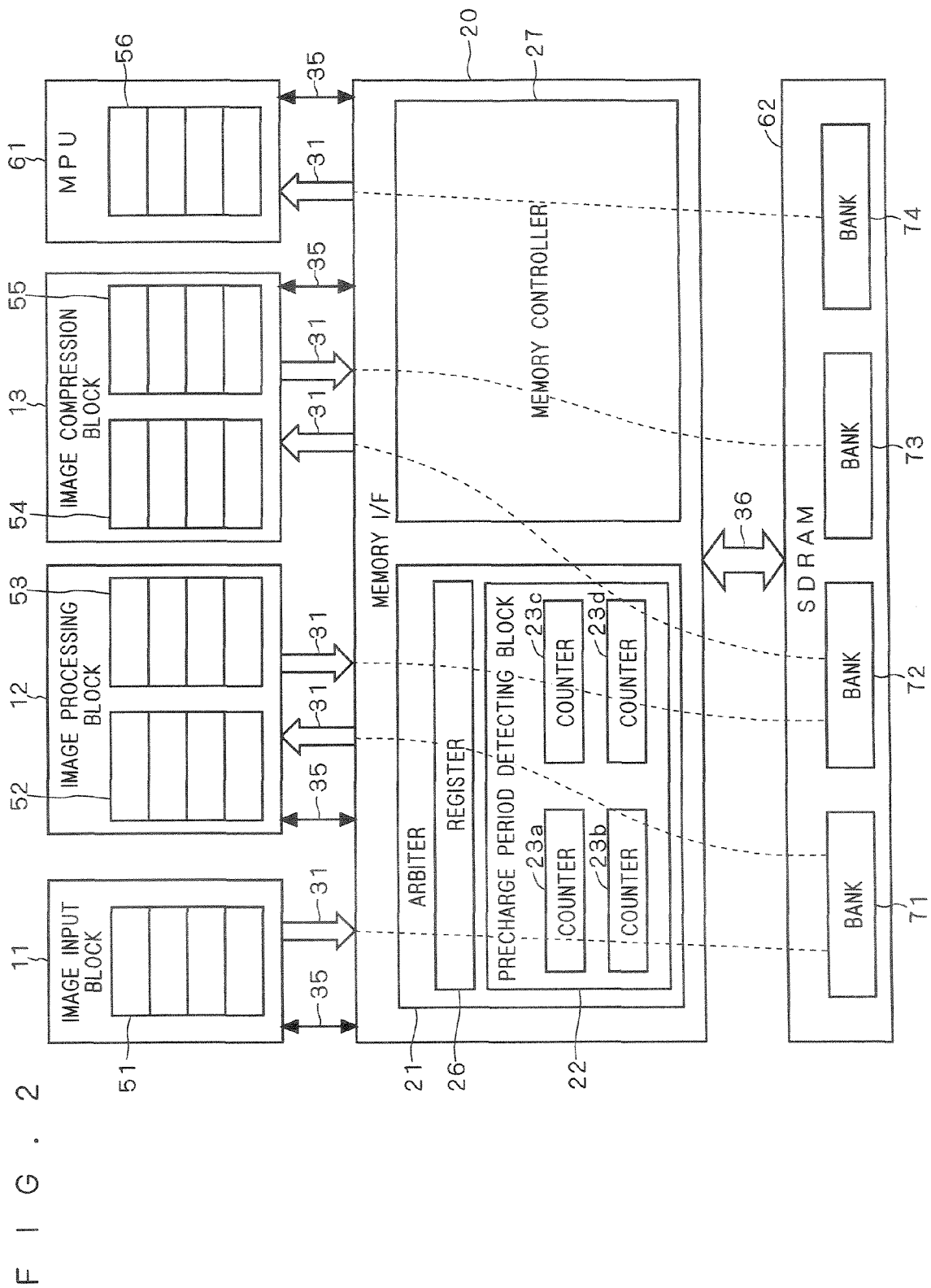
FIG. 2 is a block diagram showing an example of the configuration of the bank controller of the information processing device of the first and second preferred embodiments.

The preferred embodiments of the present invention will now be described in detail referring to the drawings.

1. First Preferred Embodiment

<1.1. Configuration of Information Processing Device>

FIG. 1 is a block diagram showing an example of the configuration of the information processing device 1 according to this preferred embodiment. FIG. 2 is a block diagram showing an example of the configuration of the bank controller 10 of the information processing device 1. The information processing device 1 is an imaging device that applies given processings to captured image data, such as a digital camera, a camera phone, etc. As shown in FIG. 1, the information processing device 1 mainly includes the bank controller 10, an imaging section 11a, an MPU 61, a synchronous DRAM 62, and an operated section 64.

As shown in FIG. 1, the imaging section 11a mainly includes a lens 11b and an imaging element 11c. The image formed on the imaging element 11c through the lens 11b is converted to an electric signal and inputted to the bank controller 10.

This preferred embodiment uses a single-plate type CCD (Charge-Coupled Devices) as an example of the imaging element 11c, where each pixel of the imaging element 11c outputs a pixel signal of one of R, G and B color components. For example, an odd-numbered horizontal line of the imaging element 11c alternately outputs a G signal and an R signal, as G→R→G→R→ . . . Also, an even-numbered horizontal line alternately outputs a B signal and a G signal, as B→G→B→G→ . . . .

The electric signal (analog signal) outputted from the imaging element 11c may be converted to a digital signal in the imaging section 11a, or may be converted to a digital signal in an image input block 11 described later. The imaging element 11c may be a CMOS sensor.

A display section 14a is formed of a liquid crystal display, for example, and the display section 14a displays images captured through the imaging section 11a or image data stored in a storage section 15a. The screen of the display section 14a may be equipped with a "touch panel" function for specifying a position on the screen through a touch with a finger, a pen, or other object, and it may be used as an input unit for accepting input operations by a user of the information processing device 1 (hereinafter referred to simply as a "user").

The storage section 15a is removable from the information processing device 1. As for the storage section 15a, a flash memory card, which is a readable and writable nonvolatile memory, is used, for example. Accordingly, the information processing device 1 can use the storage section 15a to store image data captured by the imaging section 11a. Also, the information processing device 1 can display the image data stored in the storage section 15a on the display section 14a.

Examples of the flash memory cards include Compact-Flash (registered trademark), SmartMedia (registered trademark), SD memory cards, memory sticks, MMCs (MultiMedia Cards), and xD picture cards.

The bank controller 10 controls image data communication between the banks 71 to 74 (see FIG. 2) of the synchronous DRAM 62 and the imaging section 11a, the display section 14a, and the storage section 15a (see FIG. 1), for example. As shown in FIG. 1, the bank controller 10 is located between the synchronous DRAM 62 and the devices including the imaging section 11 a, the display section 14a, and the storage section 15a. The bank controller 10 will be fully described later.

The synchronous DRAM (SDRAM: Synchronous Dynamic Random Access Memory) 62 is a readable and writable memory. As shown in FIGS. 1 and 2, the synchronous DRAM 62 is electrically connected with the bank controller 10 through a memory bus 36. The synchronous DRAM 62 undergoes data read operation, data write operation, and precharging operation, described later, in synchronization with a clock signal having a given cycle.

The synchronous DRAM 62 may be one in which data read/write operations are performed according to timing of rising of the clock signal, or one in which data read/write operations are performed by using both of the rising and falling edges of the clock signal (DDR (Double Data Rate) SDRAM), for example.

The data storage area of the synchronous DRAM 62 is divided into a plurality of regions (in this preferred embodiment, four banks 71 to 74). The bank controller 10 performs data read/write operations by specifying one of the plurality of banks 71 to 74 with a bank address and selecting memory cells, where desired data is stored, by specifying row and column addresses.

A memory cell is a minimum unit for storing data, and a memory cell holds one bit of data ("0" or "1"), for example. In this case, each memory cell represents one bit of data with the state of storage of charge. When data is read out of a memory cell, the charge of the memory cell is lost, and the data held in that memory cell is lost by the read operation.

Accordingly, in the synchronous DRAM 62, precharging operation is performed in order to prevent data held in memory cells from being lost by data read operation. That is, in the precharging operation, first, the data read from the memory cell is temporarily held in another storage circuit. Then, when the read operation is completed, the charge based on the data held in that another storage circuit is put into the memory cell from which data has been read.

In this way, after data has been read, a process of putting charge into the memory cells is performed in the period of precharging operation (hereinafter referred to also as a "precharge period"). Accordingly, during the precharge period, data read/write operation cannot be applied to the bank that contains the charged memory cells.

The operated section 64 is an input unit having operating keys, such as a keypad, for example. The user performs input operations based on the contents displayed on the display section 14*a* to cause the information processing device 1 to perform desired operations.

The ROM 63 is a read-only memory, and the MPU 61 provides control according to programs stored in the ROM 63. The MPU 61 is connected with the ROM 63 and the operated section 64 through a system bus 65. The MPU 61 is electrically connected also with the image input block 11 of the bank controller 10, its image processing block 12, image compression block 13, display processing block 14, storage section interface 15, and memory interface 20, through a data bus 31 and control lines 35. Thus, the MPU 61 is capable of performing operations, such as display of image data, by given timings according to the programs.

For the sake of simplicity, FIG. 1 only shows the control lines 35 that connect the memory interface 20 and the image input block 11, the image processing block 12, the image compression block 13 the display processing block 14, the storage section interface 15, and the MPU 61.

In the example above, programs for controlling operations of the information processing device 1 are stored in the ROM 63. However, this is shown by way of example and not of limitation, and the programs may be stored in, e.g., a flash memory, or a readable and writable nonvolatile memory.

<1.2. Configuration of Memory Interface and Neighboring Components>

Next, the bank controller 10 will be described in detail. The bank controller 10 applies given processes to the image data captured by the imaging section 11*a*, and also carries out processes for data communication with the synchronous DRAM 62. As shown in FIG. 2, the bank controller 10 mainly includes the image input block 11, the image processing block 12, the image compression block 13, the display processing block 14, the storage section interface 15, and the memory interface 20.

The image input block 11 is capable of performing real-time operations to transmit one frame of image data captured by the imaging section 11*a* to the synchronous DRAM 62 within a video frame rate. As shown in FIGS. 1 and 2, the image input block 11 has a FIFO (First-In First-Out) memory 51.

The FIFO memory 51 is a storage for temporarily storing image data that is captured by the imaging section 11*a* and that is transferred sequentially. The FIFO memory 51 is associated with the bank 71, among the banks 71 to 74 of the synchronous DRAM 62. As shown in FIGS. 1 and 2, the FIFO memory 51 is electrically connected to the bank 71 of the synchronous DRAM 62 through the data bus 31, the memory interface 20, and the memory bus 36.

When the data size of the image data stored in the FIFO memory 51 reaches a given value or more, the image input block 11 sends a data communication request signal to the memory interface 20 through the control line 35. Then, when receiving a reception signal from the memory interface 20 after sending the data communication request signal, the image input block 11 transfers the data stored in the FIFO memory 51 to the bank 71 of the synchronous DRAM 62. That is, the FIFO memory 51 can perform data communication with the associated bank 71.

The image processing block 12 applies image processing, such as interpolation, to the image data stored in the bank 71 (each piece of pixel data is for one of R, G, B). For example, by the interpolation, three colors, R, G and B, are generated for each single pixel, from the pixel data of each pixel one color. As shown in FIGS. 1 and 2, the image processing block 12 has two FIFO memories 52 and 53.

The FIFO memory 52 is a storage for temporarily storing image data (each pixel one color) that is transferred from the bank 71 to the image processing block 12. The FIFO memory 53 is a storage for temporarily storing image data (each pixel three colors) processed in a given way in the image processing block 12.

The FIFO memories 52 and 53 are associated respectively with the banks 71 and 72 of the synchronous DRAM 62. As shown in FIGS. 1 and 2, the FIFO memories 52 and 53 are electrically connected to the synchronous DRAM 62 through the data bus 31, the memory interface 20, and the memory bus 36.

When the data size of the image data stored in the FIFO memory 52 reaches a given value or less, the image processing block 12 sends a data communication request signal to the memory interface 20 through the control line 35. Then, when receiving a reception signal after sending the data communication request signal, the image processing block 12 causes the image data (each pixel one color) stored in the bank 71 to be transferred to and stored in the FIFO memory 52. That is, the FIFO memory 52 can perform data communication with the associated bank 71.

Also, after having processed image data stored in the FIFO memory 52 in the predetermined way, the image processing block 12 stores the processed image data (each pixel three colors) into the FIFO memory 53. When the data size of the image data stored in the FIFO memory 53 reaches a given value or more, the image processing block 12 sends a data communication request signal to the memory interface 20 through the control line 35. Then, when receiving a reception signal from the memory interface 20 after sending the data communication request signal, the image processing block 12 transfers the image data stored in the FIFO memory 53 to the bank 72 of the synchronous DRAM 62 and stores the image data therein. That is, the FIFO memory 53 can perform data communication with the associated bank 72.

The image compression block 13 applies compression according to, e.g., JPEG (Joint Photographic Coding Experts Group), to the image data processed in the image processing block 12 and stored in the bank 72. As shown in FIGS. 1 and 2, the image compression block 13 has two FIFO memories 54 and 55.

The FIFO memory 54 is a storage for temporarily storing image data transferred from the bank 72 to the image compression block 13. The FIFO memory 55 is a storage for temporarily storing image data compressed in the image compression block 13.

The FIFO memories 54 and 55 are associated respectively with the banks 72 and 73 of the synchronous DRAM 62. As shown in FIGS. 1 and 2, the FIFO memories 54 and 55 are electrically connected to the synchronous DRAM 62 through the data bus 31, the memory interface 20, and the memory bus 36.

When the data size of the image data stored in the FIFO memory 54 reaches a given value or less, the image compression block 13 sends a data communication request signal to the memory interface 20 through the control line 35. Then, when receiving a reception signal from the memory interface 20 after sending the data communication request signal, the image compression block 13 causes image data stored in the bank 72 to be transferred to and stored in the FIFO memory 54. That is, the FIFO memory 54 can perform data communication with the associated bank 72.

After applying compression processing to the image data stored in the FIFO memory 54, the image compression block 13 stores the compressed image data in the FIFO memory 55. When the data size of the image data stored in the FIFO memory 55 reaches a given value or more, the image compression block 13 sends a data communication request signal to the memory interface 20 through the control line 35. Then, when receiving a reception signal from the memory interface 20 after sending the data communication request signal, the image compression block 13 transfers the image data stored in the FIFO memory 55 to the bank 73 of the synchronous DRAM 62 and stores the image data therein. That is, the FIFO memory 55 can perform data communication with the associated bank 73.

Like the image input block 11, the image processing block 12, and the image compression block 13, the MPU 61 has a FIFO memory 56. The FIFO memory 56 is a storage for temporarily storing programs stored in the synchronous DRAM 62 and data required to execute the programs (parameter data, image data, etc.).

The FIFO memory 56 is associated with the bank 74 of the synchronous DRAM 62. As shown in FIGS. 1 and 2, the FIFO memory 56 is electrically connected to the synchronous DRAM 62 through the data bus 31, the memory interface 20, and the memory bus 36.

When the size of the programs and data stored in the FIFO memory 56 reaches a given value or less, the MPU 61 sends a data communication request signal to the memory interface 20 through the control line 35. Then, when receiving a reception signal from the memory interface 20 after sending the data communication request signal, the MPU 61 causes programs and data stored in the bank 74 to be transferred to and stored in the FIFO memory 56. That is, the FIFO memory 56 can perform data communication with the associated bank 74.

In this way, the image input block 11, the image processing block 12, the image compression block 13, and the MPU 61, which are used as a plurality of processing blocks in this preferred embodiment, respectively include the FIFO memory 51, the FIFO memories 52 and 53, the FIFO memories 54 and 55, and the FIFO memory 56.

Also, the FIFO memories 51 to 56 can perform data communication respectively with the associated banks 71, 71, 72, 72, 73 and 74 of the synchronous DRAM 62.

The pieces of image data stored in the FIFO memories 51, 53 and 55 are sent to the banks 71, 72 and 73 in a first-in first-out manner in the order in which they were stored. The pieces of image data stored in the FIFO memories 52 and 54 undergo given image processing and compression in a first-in first-out manner in the order in which they were stored. Also, the programs stored in the FIFO memory 56 are executed in a first-in first-out manner in the order in which they were stored. That is, the data pieces stored in the FIFO memories 51 to 56 undergo given processes in a sequential manner (transmission, image processing, etc.).

Accordingly, the memory capacities of the FIFO memories 51 to 56 can be set at a small value as compared with the memory capacities of the banks 71 to 74.

The FIFO memories 51 to 56 are assigned their respective channel numbers "1" to "6". The channel numbers are pieces of information that are used to determine the order of priorities as will be described later. The priorities of the FIFO memories 51 to 56 are determined on the basis of the channel numbers when other pieces of information for determining the priorities (for example, "the state of precharge" described later) are in the same conditions.

In this preferred embodiment, when pieces of information other than the channel numbers are all in the same conditions, FIFO memories having smaller channel numbers are assigned higher priorities. That is, when pieces of information other than the channel numbers are in the same conditions, the FIFO memory 51 of the image input block 11 having the channel number "1" is assigned the highest priority. This allows the image input block 11, which requires real-time properties, to smoothly achieve its operations.

The display processing block 14 operates to display information, such as image data and character data, in the display section 14a. For example, the display processing block 14 displays image data that has been captured by the imaging section 11a and processed by the image processing block 12. The display processing block 14 also displays image data that is stored in the storage section 15a.

The storage section interface 15 processes data communication with the storage section 15a. For example, the storage section interface 15 stores image data from the storage section 15a into a given region in the synchronous DRAM 62, or stores image data from a given region of the synchronous DRAM 62 into the storage section 15a.

The memory interface 20 controls the data communication performed between the synchronous DRAM 62 and the MPU 61, the image input block 11, the image processing block 12, the image compression block 13, the display processing block 14, and the storage section interface 15. As shown in FIGS. 1 and 2, the memory interface 20 mainly includes an arbiter 21 and a memory controller 27.

The arbiter (a priority order determining block) 21 determines the order of priorities of data communication transactions performed between the FIFO memories 51 to 56 and the associated banks 71 to 74. As shown in FIG. 2, the arbiter 21 mainly includes a precharge period detecting block 22 and a register 26.

The precharge period detecting block 22 detects the states of precharge of the banks 71 to 74. As shown in FIG. 2, the precharge period detecting block 22 includes a plurality of (four, in this preferred embodiment) counters 23a to 23d (a plurality of first counters).

The counters 23a to 23d are associated in a one-to-one correspondence respectively with the banks 71 to 74. The counters 23a to 23d start counting a counter clock signal when they detect the start of a precharging operation of the associated one of the banks 71 to 74.

The precharging operation of the synchronous DRAM 62, as well as the read/write operations, is performed in synchronization with a clock signal having a given cycle, and the time required for the precharging operation (hereinafter referred to also as a "precharge time") is determined by the kind of the synchronous DRAM 62.

Accordingly, the precharge period detecting block 22 can detect whether or not the respective banks 71 to 74 are in a precharge period by detecting whether the counter clock signal has been counted for a given number of times after the precharging operation started (e.g., the precharge period detecting block 22 starts counting at the time when it detects the start of a precharging operation, and it detects whether the counter clock signal has been counted a given number of times that corresponds to the precharge time).

Data read/write operation cannot be applied to a bank that is being precharged. Accordingly, in a conventional information processing device, when a bank being precharged is selected for data communication, the data communication process is made to wait until the precharging operation is completed. The data communication efficiency of the entire device is thus lowered in such a conventional information processing device.

However, in the information processing device 1 of this preferred embodiment, the precharge period detecting block 22 can detect whether the banks 71 to 74 are in a precharge period. This allows the information processing device 1 to determine the order of priorities in data communication between the FIFO memories 51 to 56 and the associated banks 71 to 74 at least on the basis of the states of precharge of the banks 71 to 74. This enables fair data communication with the banks 71 to 74 and enhances the data communication efficiency. Methods of determining the order of priorities will be described later.

The register 26 is a storage that is formed of semiconductor elements, and is used to store data required for the determination of the order of priorities. For example, the register 26 stores data that indicates whether the banks 71 to 74 are in a precharge period, and data that indicates whether a data communication request signal is being presented. The arbiter 21 refers to the data stored in the register 26 to determine the order of priorities among the FIFO memories 51 to 56.

On the basis of the order of priorities determined by the arbiter 21, the memory controller 27 specifies a bank in the synchronous DRAM 62, row and column addresses on the bank, and the data size. The memory controller 27 thus enables the execution of data communication between the FIFO memory with high priority and the corresponding bank.

<1.3. Method of Determining Priority Order>

A method of determining the priority order among the FIFO memories 51 to 56 will be described. FIGS. 3 to 6 are diagrams showing examples of data stored in the register 26 in this preferred embodiment. In FIGS. 3 to 6, each row (record) has fields including "Precharge flag", "Request signal flag", and "Priority".

The "Precharge flag" fields store information about the states of precharge of the banks 71 to 74 that are associated with the FIFO memories 51 to 56. That is, when "Precharge flag"="True", it means that the corresponding one of the banks 71 to 74 is in a precharge period. On the other hand, when "Precharge flag"="False", it means that the corresponding one of the banks 71 to 74 is not in a precharge period.

The "Request signal flag" fields store "True" when a data communication request signal is received from the image input block 11, the image processing block 12, the image compression block 13, or the MPU 61.

That is, when "Request signal flag"="True", it means that the data size of the data stored in the FIFO memory 51, 53 or 55 is equal to or more than a given value and data should be sent to the synchronous DRAM 62, or it means that the data size of the data stored in the FIFO memory 52, 54 or 56 is equal to or less than a given value and data should be received from the synchronous DRAM 62.

On the other hand, when "Request signal flag"="False", it means that the data size of the data stored in the FIFO memory 51, 53 or 55 is smaller than a given value, or that the data size of the data stored in the FIFO memory 52, 54 or 56 is larger than a given value.

When a data communication transaction by a FIFO memory with "Request signal flag"="True" has been executed, "False" is stored as the corresponding "Request signal flag".

The "Priority" fields store values that correspond to the priorities of the FIFO memories 51 to 56, where smaller values are stored for FIFO memories having higher priorities.

The order of priorities of the FIFO memories 51 to 56 of this preferred embodiment is chiefly determined, by the arbiter 21, on the basis of the states of precharge of the banks 71 to 74 and the data communication request signals sent from the processing blocks 11, 12, 13, 61, etc. to the memory interface 20. More specifically, the order of priorities is determined according to the rules (1) to (3) below.

(1) When all "Precharge flags" are "False" and all "Request signal flags" are "True" (i.e., when the "Precharge flags" and "Request signal flags" are all in the same conditions: see FIG. 3), then the order of priorities of the FIFO memories 51 to 56 is determined on the basis of their channel numbers. That is, the FIFO memories 51 to 56 are assigned priorities that descend in this order.

(2) When all "Precharge flags" are "False" and some "Request signal flags" are "False", the FIFO memories with "Request signal flag"="False" are excluded from the process of determining the priority order, and the order of priorities is determined only among the FIFO memories with "Request signal flag"="True". More specifically, the order of priorities is determined according to the procedure below.

(2-1) The order of priorities is determined about the FIFO memories with "Request signal flag"="True". For instance, in the example of FIG. 4, the priorities of the FIFO memories 51, 53, 55 and 56 are determined and "1", "2", "3" and "4" are stored in the corresponding "Priority" fields.

(2-2) At the same time, with the FIFO memories 52 and 54 with "Request signal flag"="False", a value indicating the exclusion from the data communication is stored in each of the corresponding "Priority" fields, and they are excluded from the data communication (the value is shown with "-" in FIG. 4, and also in FIGS. 5 to 8).

(3) When some "Precharge flags" are "True", the priorities are determined only about the FIFO memories with "Precharge flag"="False" (not in a precharge period) and "Request signal flag"="True".

More specifically, (3-1) the order of priorities is determined about the records where "Precharge flag"="False" and "Request signal flag"="True". For instance, in the example of FIG. 5, "1" and "2" are stored in the "Priority" fields for the FIFO memories 53 and 56.

(3-2) With the FIFO memories 51, 52, 54 and 55 with "Precharge flag"="True" or "Request signal flag"="False", the value indicating the exclusion from the data communication is stored in the corresponding "priority" fields, and they are thus excluded from the data communication.

In this way, in this preferred embodiment, FIFO memories with "Precharge flag"="True" or "Request signal flag"="False" are excluded from the process of determining the order of priorities of the FIFO memories 51 to 56. This solves the problem that, if a bank that is being precharged is selected for data communication, then none of the FIFO memories 51 to 56 can perform data communication until the precharge period ends. This prevents the occurrence of waits due to precharge periods, and enables efficient data communication between the FIFO memories 51 to 56 and the synchronous DRAM 62.

When the precharging operation ends and the value of the "Precharge flag" changes from "True" to "False", the "Priorities" for the records are re-computed according to the rules (1) to (3).

For example, as shown in FIG. 6, when a precharging operation to the bank 71, which corresponds to the FIFO memory 51, ends, then the priorities are computed about the records where "Precharge flag"="False" and "Request signal flag"="True", and "1", "2" and "3" are stored as the "Priorities" of the FIFO memories 51, 53 and 56.

<1.4. Advantages of Information Processing Device of First Preferred Embodiment>

As described above, the information processing device 1 of the first preferred embodiment implements a control method for controlling data communication performed between the banks 71 to 74 of the synchronous DRAM 62 and the bank controller 10, where, when any of the banks 71 to 74 is being precharged, the FIFO memory or memories associated with the bank being precharged are excluded from the determination of priorities. This prevents occurrence of waits due to precharge periods, and enables efficient data communication between the FIFO memories 51 to 56 and the synchronous DRAM 62.

2. Second Preferred Embodiment

Next, a second preferred embodiment of the present invention will be described. The first and second preferred embodiments differ only in the method of determining the order of priorities among the FIFO memories 51 to 56, and they use the same hardware configuration. Accordingly, the description below will chiefly explain the difference.

<2.1. Method of Determining Priorities>

FIGS. 7 and 8 are diagrams showing examples of data stored in the register 26 in this preferred embodiment. In this preferred embodiment, the order of priorities of the FIFO memories 51 to 56 is chiefly determined, by the arbiter 21, on the basis of the states of precharge of the banks 71 to 74 and the data communication request signals sent from the processing blocks 11, 12, 13, 61, etc. to the memory interface 20. Specifically, the priorities are determined according to the rules (1) to (3) below.

In this preferred embodiment, as in the first preferred embodiment, (1) when all "Precharge flags" and all "Request signal flags" are in the same conditions (see FIG. 3), the FIFO memories 51 to 56 are assigned priorities that descend in this order. Also, (2) when all "Precharge flags" are "False" and some "Request signal flags" are "False", then the priorities are determined only about the FIFO memories with "Request signal flag"="True", and the FIFO memories with "Request signal flag"="False" are excluded from the process of determining the order of priorities.

(3) Next, when some "Precharge flags" are "True", the priorities are first determined about FIFO memories with "Precharge flag"="False", and the priorities are next determined about FIFO memories with "Precharge flag"="True".

More specifically, (3-1) with "Precharge flag"="False", priorities are determined only about the records where "Request signal flag"="True", and FIFO memories with "Request signal flag"="False" are excluded from the process of determining priorities. For example, in FIG. 7, "1" and "2" are stored respectively as the "Priorities" of the FIFO memories 53 and 56, and the value indicating the exclusion from the data communication is stored as the "Priority" of the FIFO memory 52, and the FIFO memory 52 is excluded from the data communication.

(3-2) With "Precharge flag"="True", priorities are determined only about the records where "Request signal flag"="True", and FIFO memories with "Request signal flag"="False" are excluded from the process of determining the priorities. For example, in FIG. 7, "3" and "4" are stored respectively as the "Priorities" of the FIFO memories 51 and 55, and the value indicating the exclusion from the data communication is stored as the "Priority" of the FIFO memory 54.

In this way, in this preferred embodiment, the order of priorities is determined on the basis of the information about "Request signal flags", the information about "Precharge flags", and the information about "Channel numbers", where these pieces of information are referred to in this order of precedence.

When a precharging operation is completed and the "Precharge flag" changes from "True" to "False", then the "Priorities" in the records are re-computed according to the rules (1) to (3).

For example, as shown in FIG. 8, when the operation of precharging the bank 73 associated with the FIFO memories 54 and 55 ends, the priorities are first computed about the records where "Precharge flag"="False" and "Request signal flag"="True", and "1", "2" and "3" are stored respectively as the "Priorities" of the FIFO memories 53, 55 and 56. Next, the priority is determined about the record where "Precharge flag"="True" and "Request signal flag"="True", and "4" is stored as the "Priority" of the FIFO memory 51.

<2.2. Advantages of Information Processing Device of Second Preferred Embodiment>

As described above, the information processing device 1 of the second preferred embodiment implements a control method for controlling data communication performed between the banks 71 to 74 of the synchronous DRAM 62 and the bank controller 10, where the order of priorities among the FIFO memories 51 to 56 is determined in such a way that, when any of the banks 71 to 74 is being precharged, the FIFO memory or memories associated with the bank being precharged are ranked lower in priority than FIFO memories associated with banks not being precharged. That is, in the second preferred embodiment, the order of priorities among the FIFO memories 51 to 56 is determined by referring to the pieces of information about "Request signal flags" and "Precharge flags" according to this order of precedence.

This solves the problem that, if one of the banks 71 to 74 that is being precharged is selected for data communication, then none of the FIFO memories 51 to 56 can perform data communication until the precharge period ends. This enables efficient data communication between the FIFO memories 51 to 56 and the synchronous DRAM 62, as in the first preferred embodiment.

While the invention has been described in detail, the foregoing description is in all aspects illustrative and not restrictive. It is understood that numerous other modifications and variations can be devised without departing from the scope of the invention.

What is claimed is:

1. A bank controller that controls communication to banks of a synchronous dynamic random access memory (DRAM), comprising:

(a) a plurality of processing blocks each having at least one first-in first-out (FIFO) memory that is associated with one of the banks of said synchronous DRAM and capable of performing data communication with the associated bank, said plurality of processing blocks performing predetermined operations with data stored in said FIFO memories; and (b) a memory interface that controls said data communication, said memory interface comprising:

(b-1) a priority order determining block that determines an order of priorities in said data communication between said FIFO memories and the associated banks; and (b-2) a memory controller that implements the data communication between one of said FIFO memories that is assigned a high priority in said data communication and the associated bank, wherein said priority order determining block determines said order of priorities in said data communication at least on the basis of states of precharge of said banks, said precharge of said banks is an operation performed on said banks after stored data is read from said banks to prevent a loss of said stored data said priority order determining block determines said order of priorities among said FIFO memories on the basis of, in an order of precedence, (1) information about communication request signals sent from said processing blocks to said memory interface, and (2) information about the states of precharge of said banks, where these information (1) and (2) are referred to in this order of precedence, and when said information (1) and (2) are in same conditions, said priority order determining block determines said order of priorities on the basis of channel numbers assigned to said FIFO memories.

2. The bank controller according to claim 1, wherein said priority order determining block determines said order of priorities among said FIFO memories in such a way that, when any of said banks is being precharged, the one or more of said FIFO memories that are associated with the bank being precharged are excluded from the determination of said order of priorities and said order of priorities is determined among ones of said FIFO memories associated with ones of said banks that are not being precharged.

3. The bank controller according to claim 1, wherein said priority order determining block determines said order of priorities among said FIFO memories in such a way that, when any of said banks is being precharged, the one or more of said FIFO memories that are associated with the bank being precharged are ranked lower in priority than ones of said FIFO memories associated with ones of said banks that are not being precharged.

4. The bank controller according to claim 1, wherein said priority order determining block comprises a plurality of first counters that are associated in a one-to one correspondence with said banks and that detect whether said banks are being precharged or not by counting a counter clock signal for a predetermined number of times after a precharging operation of the associated bank started.

5. An information processing device comprising:
said bank controller according to claim 1; and
said synchronous DRAM, said synchronous DRAM being connected to said bank controller through a bus.

6. An information processing device comprising:
said bank controller according to claim 2; and
said synchronous DRAM, said synchronous DRAM being connected to said bank controller through a bus.

7. An information processing device comprising:
said bank controller according to claim 3; and
said synchronous DRAM, said synchronous DRAM being connected to said bank controller through a bus.

8. An information processing device comprising:
said bank controller according to claim 4; and
said synchronous DRAM, said synchronous DRAM being connected to said bank controller through a bus.

9. An imaging device comprising: (a) an imaging section;

(b) a synchronous dynamic random access memory (DRAM); and (c) a bank controller that controls communication to banks of said synchronous DRAM, said bank controller comprising:

(c-1) a plurality of processing blocks each having at least one first-in first-out (FIFO) memory that is associated with one of said banks of said synchronous DRAM and capable of performing data communication with the associated bank, said plurality of processing blocks performing predetermined operations with data stored in said FIFO memories; and (c-2) a memory interface that controls said data communication, said memory interface comprising:

a priority order determining block that determines an order of priorities in said data communication between said FIFO memories and the associated banks; and a memory controller that implements the data communication between one of said FIFO memories that is assigned a high priority in said data communication and the associated bank, wherein said plurality of processing blocks include an image input block that at least performs operations of temporarily storing image data captured by said imaging section into its own said FIFO memory and sending the image data to said synchronous DRAM, said priority order determining block determines said order of priorities among said FIFO memories at least on the basis of, in an order of precedence, (1) information about states of precharge of said banks, and (2) information about channel numbers assigned to said FIFO memories, where these information (1) and (2) are referred to in this order of precedence, and the channel number assigned to the FIFO memory of said image input block is set such that the FIFO memory of said image input block is assigned a highest priority when pieces of information other than the information about the channel numbers are in same conditions.

10. A method of controlling data communication performed between banks of a synchronous dynamic random access memory (DRAM) and a bank controller, said bank controller comprising a plurality of processing blocks each having at least one first-in first out (FIFO) memory that is associated with one of said banks of said synchronous DRAM and capable of performing data communication with the associated bank, said method comprising the steps of:

(a) applying predetermined operations to data stored in said FIFO memories;

(b) determining an order of priorities in the data communication between said FIFO memories and the associated banks at least on the basis of states of precharge of said banks; and (c) implementing the data communication between one of said FIFO memories that is assigned a high priority in said data communication and the associated bank, wherein said precharge of said banks is an operation performed on said banks after stored data is read from said banks to prevent a loss of said stored data, said determining is performed at least on the basis of (1) information about communication request signals sent from said processing blocks to said bank controller and (2) information about the states of precharge of said banks, and the order of priorities is determined based on channel numbers assigned to said FIFO memories when said information (1) and (2) are in same conditions.

* * * * *